United States Patent [19]

Colonel et al.

[11] Patent Number: 4,823,883

[45] Date of Patent: Apr. 25, 1989

[54] SHOCK RELIEVING HORSESHOE

[76] Inventors: Richard C. Colonel, P.O. Box 2192, 701 122th Ave., NE., #410, Belview, Wash. 98007; De Vere V. Lindh, 1910 Dogwood Dr., SE., Auburn, Wash. 98002

[21] Appl. No.: 106,252

[22] Filed: Oct. 8, 1987

[51] Int. Cl.$^4$ .............................................. A01L 1/00
[52] U.S. Cl. ..................................................... 168/12
[58] Field of Search ............................... 168/12, 14, 15

[56] References Cited

U.S. PATENT DOCUMENTS

| | | | |
|---|---|---|---|
| 742,362 | 10/1903 | Sinnott | 168/14 |
| 942,012 | 11/1909 | Randall | 168/12 |
| 948,245 | 2/1910 | Owens | 168/12 |
| 1,127,561 | 2/1915 | Wilt et al. | 168/15 |
| 3,180,421 | 4/1965 | Hirshberg et al. | 168/12 |

Primary Examiner—Robert P. Swiatek
Attorney, Agent, or Firm—Robert W. Jenny

[57] ABSTRACT

The horseshoe comprises a spring and a wear plate. The spring has essentially parallel and flat top and bottom surfaces and is shaped in the outline of a horse's hoof in plan view. It comprises layers parallel to the top and bottom interconnected by spaced apart compression members. For the layers having compression members on both their sides, the compression members on one side are located opposite the spaces between the compression members on the other side. The structure is therefore a multiplicity of small spring elements. The spring material has a modulus of elasticity of approximately 350,000 pounds per square inch, a density of approximately 0.05 pounds per cubic inch and an allowable working stress in the range of 15,000 to 22,000 PSI. The configuration of the spring, in combination with these properties, provides a working deflection in the range of 0.3 to 0.5 inches and a spring rate in the range of 4000 to 6000 pounds per inch. The spring is attached to the hoof by conventional fasteners and techniques. The wear plate is attached to the bottom of the spring with conventional fasteners.

6 Claims, 1 Drawing Sheet

SHOCK RELIEVING HORSESHOE

BACKGROUND OF THE INVENTION

1. Field:

The subject invention is in the field of apparatus for protecting horses hooves and for avoiding or ameliorating harm done to the hooves and other parts of the animal by contacts of the hooves on terrain. On a corollary basis, the invention is in the field of hoofwear provided for the purpose of improving performance of horses in terms of running speed, jumping capability and the like.

2. Prior Art:

Prior art in this field includes that shown in U.S. Pat. Nos.:

3,180,421
3,921,721
4,189,004
4,206,811
4,496,002
4,299,288
4,333,532
4,420,046

British Pat. No. 565,723 discloses structural forms bearing similarities to structural features of embodiments of the subject invention.

Close prior art is disclosed in U.S. patent application Ser. No. 010,552 filed 2/3/87 by the present inventors and titled Shock Relieving Horseshoe.

Also, in the book entitled "The World Almanac Book of Inventions" by Valerie-Anne Giscard d'Estaing, distributed in the United States by Ballantine Books, on page 139 there is an illustration of a horse fitted with air-cushioned shoes, said to enable the horse to jump even on very hard pavement.

U.S. Pat. No. 4,496,002 covers a horseshoe made of ultra-high molecular weight polyethylene plastic. This patent clearly documents the relationship between lameness in horse's legs and the shocks applied to them by the horse's hooves, citing as a reference "Foreleg Fatigue Fracture," Cheney, J. A.; Lion, S. Y.; Shen, C. K. and Wheat, J. D., Thoroughbred of California, November 1971.

The horseshoe of U.S. Pat. No. 4,496,002 provides some shock relief because of the material from which it is made. It also offers relief by not restricting the natural action of the hoof. It is well known that the natural action reduces the shocks and the lameness attributed to them. This patent cites a comprehensive study of the structure and behavior of horses' feet in action, to be found in the August 1977 issue of Saddle Action, published by Saddle Action, Inc., Paso Robles, Calif., pages 18-21, 50, written by K. D. Butler, Jr. It is stated in the patent that in order for the hoof to function optimally as an absorber, the lower surface of the hoof should have a specific contour. It can be concluded that the proper contour would be produced by normal wear of an unshod hoof of a feral animal.

U.S. Pat. No. 4,333,532 covers a horseshoe devised specifically to facilitate the natural shock absorbing characteristics of horse's hooves, while providing protection and traction for the hooves.

It is well known that in any instance in which a shock is absorbed the energy involved is either converted to heat or stored by some form of energy storage apparatus or some combination of the two. Stored energy is returned and may do useful work when and if the force involved in the action is decreased. Energy converted to heat constitutes a loss of some of the energy being expended for whatever purpose and tends to defeat the purpose of the energy expenditure. In the case of a horse, the energy loss can be manifested in the form of decreased stamina (increased fatigue).

In view of the above discussion it can be concluded that there is a long standing need to shoe horses with apparatus which minimizes, as much as possible by shock relief, the tendency for contacts of the hooves with terrain to produce lameness and other ill effects. At the same time, there are advantages to be gained if the shock relief is accomplished with minimal associated effects such as decrease in stamina due to lost energy. Therefore it is a prime objective of the subject invention to provide hoof wear for a horse which efficiently relieves the shocks on horse's hooves fitted with the hoof wear, the efficiency deriving from the characteristic that the hoof wear stores and returns considerably more of the energy than it converts to heat. Since the efficiency of the natural shock relief of horses' hooves is not generally known and may not be high, it is a further objective of the subject invention to provide efficient shock relief without significant dependence on the hoof's natural shock relief characteristics but without interfering with the natural shock relief to any significant degree. Further objectives are that the hoof wear, which may be termed a horseshoe, have a weight which is in the range of weights for more conventional horseshoes and be fittable and attachable using well known farrier apparatus and techniques. It is a specific objective that the horseshoe weigh no more than 16 ounces and preferably less than 10 ounces. Further, it is an objective that the shoe be no higher than 1.75 inches with a height of less than 1.5 inches preferred. Another objective is that the horseshoe not be adversely affected by use in mud, gravel and the like. Still further objectives are that the horseshoe be durable by conventional standards and suitably economical to manufacture and use.

SUMMARY OF THE INVENTION

The subject horseshoe, in a preferred embodiment, comprises two parts. Both are generally horseshoe shaped. The primary part is a spring. The other part is a wear plate. The primary part is attached to the hoof using apparatus and techniques known in the art. The wear plate is attached to the underside of the primary part.

The primary part, or spring, has a top surface and a bottom surface essentially parallel to each other, a back and a continuous horseshoe shaped surface forming the front and sides. The spring comprises layers of material, parallel to the top and bottom surfaces and separated by spaced apart compression members. The compression members on one side of each layer are located opposite the spaces between the compression members on the other side of each layer. In the preferred embodiment there are no compression members on the top side of the top layer, i.e. the top surface, and the bottom side of the bottom layer, i.e. the bottom surface, although in other embodiments there may be compression members on these surfaces. The layers and compression members form a complex of beams loaded generally at their centers.

Cutaways on each side of the spring form flanges between the tops of the cutaways and the top surface and the flanges are used for fastening the springs to hooves using conventional apparatus and techniques. The wearplates are fastened to the bottom surfaces of the springs. Auxiliary springs, shaped to fill the cutaways may be used, fastened to the wear plate.

In a preferred embodiment the compression members are ridges running in the front/back direction of the spring. The crossection of the spring transverse to the ridges therefore appears as a multiplicity of slots bounded by ridge and layer surfaces.

In an alternate embodiment the spring is U shaped in plan view, having a notch running from the back toward the front midway between the sides. In another alternate embodiment the notch extends only partway from bottom to top and, in still another embodiment, partway from top to bottom. These alternate embodiments are design compromises involving support of the frog portion of the hoof and allowance of the natural shock relieving function of the horse's hoof in which the after parts of the hoof spread apart somewhat under load.

The weight of the horseshoe, its height and its energy absorption and release capacity relative to the built in deflection capabilities are functions of the characteristics of the material from which the spring is made and the details of its design. The material selection is of primary importance and the design details are dependent in good part on the material characteristics and the desired energy capacity. In a preferred embodiment the maximum deflection is geometrically limited to 0.4 of an inch, in the range of 0.3 to 0.6 inches. The design load at full, limited deflection is 2000 pounds, within the range of 1500 to 2500 pounds. As a hoof contacts the terrain a mass to be supported by the hoof, including the masses of the hoof and leg, will be rapidly decelerated and the force experienced by the hoof comprises the force required to decelerate the mass and other forces related to supporting and/or propelling the horse. If the deceleration occurs during the time it takes for the horseshoe to compress 0.4 of an inch, then the maximum load on the hoof will be no more than 2000 pounds. Without the shoe and on relatively hard terrain, even with the natural shock absorption characteristics of the hoof, some parts of the hoof and leg would quite likely be subjected to impact forces well in excess of 2000 pounds, recognizing that, theoretically, a mass decelerated instantly is subjected to an infinite force.

In further regard to material selection, for a spring in which the material is primarily subjected to bending stress to have an optimum ratio of energy capacity to weight and size, the material should have a low modulus of elasticity (unit stress/unit strain) and a low density and a desirable ratio of its allowable working stress to its modulus of elasticity. The allowable working stress is the highest stress to which the material can be repeatedly subjected in bending with essentially no chance of fatigue failure. The low coefficient of elasticity makes it possible for the spring of given proportions to deflect more under a given load than a similar spring made of material with a higher coefficient of elasticity. A material having this deflection capability, in combination with low density, makes it possible to manufacture the subject horseshoe with a weight in the weight range of conventional horseshoes. It is necessary, obviously, that the material have an adequate strength, along with the low modulus of elasticity and low density. The ratios of allowable working stress to modulus of elasticity and density provide a convenient basis for comparison of materials in terms of weight and strength. The material used in the subject spring should have ratios in the range of or better than those for steel.

An acetal plastic material with the described characteristics is commercially available under the name Delrin. This material has a modulus of elasticity of 350,000 PSI. Its working stress is 17,000 PSI in bending, within the range of 15,000 to 22,000 PSI for such materials, and its density is 0.05 pounds per cubic inch. The modulus of elasticity of steel is $30 \times 10^6$. The non-fatigue, working stress in bending for steel is about 100,000 PSI and the density of steel is 0.286 pounds per cubic inch. Accordingly, the working stress to density for steel is $100,000/0.286 = 349,650$ and for Delrin it is $17,000/0.05 = 340,000$. For steel the ratio of working stress to modulus of elasticity, assuming an allowable working stress as high as 160,000 PSI, is 0.0053. For Delrin the ratio is 0.049 or about 10 times that for steel. These values indicate that materials like Delrin have adequate strength for the subject purposes. A spring of the design used in the subject shoe and made of Delrin weighs approximately one-third as much as a spring of similar design but configured to be made of steel. Springs made of materials having a low modulus of elasticity and low density comprise thicker sections and more bulk in general than similar springs made of steels of various kinds. The extra bulk is advantageous in that the springs are more robust and inherently more stable structurally and less sensitive to dimensional tolerances. Further, materials such as Delrin are known to have excellent resistance to fatigue failures, i.e. failures caused by repeated loadings. Also such materials are not subject to corrosion.

To effectively reduce the chances for damage to the horseshoe by gravel, mud and the like, the openings at the ends of the slots are covered by an elastomeric shield.

In summary, the subject invention comprises a spring as described, made of a material having the characteristics noted as desired, in combination with a wear plate. It can be understood from this description that the invention meets its objectives. The spring significantly relieves shock loads to the horse's hooves. It accommodates but does not depend on the natural shock relief characteristics of horse's hooves. Its weight is in the range of acceptable weight for horseshoes and close to the desired 10 ounces. It has been determined that shoes no higher than 1.5 inches have acceptable energy storage and release capacity. The elastomeric shields prevent adverse effects of mud, gravel and the like. It is fitted and attached in the same manner as conventional horseshoes. It is durable and economical to manufacture, in part because of the nature of the spring material used, and in part because of the details of the design.

DETAILED DESCRIPTION OF THE INVENTION

Figure 1:
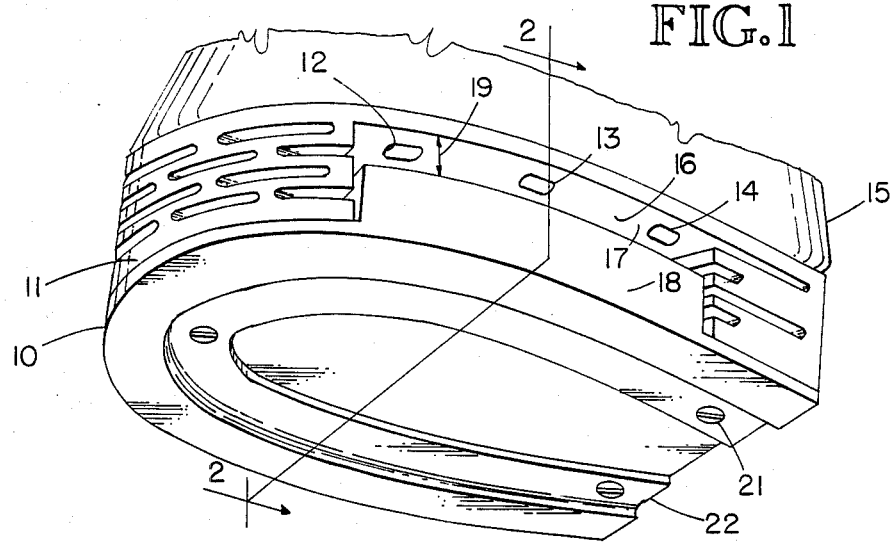
FIG. 1 is a perspective illustration of the subject horseshoe in place on a horse's hoof and viewed from below.

FIG. 1 is a perspective view of the subject shoe, viewed from below. The wear plate 10, made of metal, is fastened to the spring component 11 by fasteners 21. The spring component is fastened to the hoof 15 by conventional horseshoe nails through flanges, the left flange 16 being visible in this view. The flange is formed by a cutaway in the spring component, cutaway 17 being visible in this view. The cutaways may be partially filled by protrusions from the wear plate, protrusion 18 being shown. Gap 19 allows for spring component compressive deflection. Alternately, the cutaways may be occupied by auxiliary spring components fastened to a wear plate which has no protrusions into the recesses.

Figure 2:
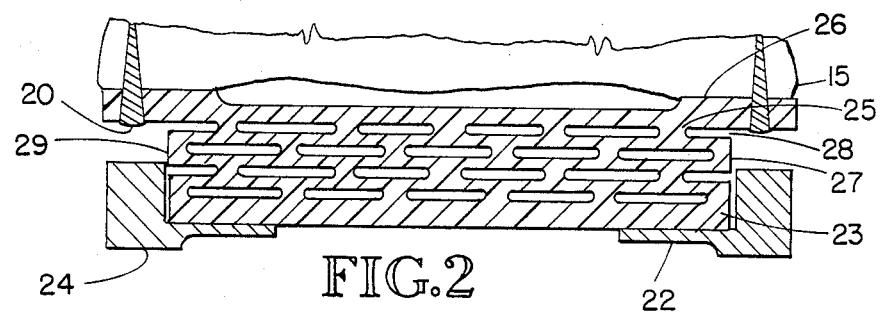
FIG. 2 is a sectional view of the horseshoe taken at 2—2 in FIG. 1.

FIG. 2 is a sectional view taken at 2—2 in FIG. 1, illustrating the configuration of the spring, the fastening of the spring to the hoof and the fastening of the wear plate to the spring. The spring is fastened to the hoof by conventional fasteners 12, 13, 14, 20 used for attaching horseshoes, fastener 20 being typical. The wear plate is attached by screw fasteners, fastener 21 being typical. Flange 22 on the wear plate and layer 23 of the spring, being thicker than the others, help distribute load from rim 24 on the wear plate into the spring. Similarly, layer 25 is thicker than the intermediate layers and helps distribute load from the spring to rim 26 in contact with the hoof. Layer 25 is also in contact over some of its area with that portion of the hoof known as the frog and some of the load is transmitted to the frog.

As shown in FIG. 2, the spring, because of the conformation and positioning of the slots, slots 27 and 28 being representative of the closed and open slots respectively, comprises layers separated by compression members, member 29 being typical. The layers and compression members function as a multiplicity of beams loaded near or at their centers. In the preferred embodiment illustrated the slots, beams and compression members extend from front to back of the spring. They could extend from side to side of or diagonally across the spring. Also they can be posts instead of ridges, in which case the layers function as a multiplicity of diaphragm type springs.

The operational characteristics of the spring depend on, among other factors, the number of and thicknesses of the layers, the location and spacings of the compression members and the characteristics of the materials and the concept lends itself very well to the tailoring of the operational characteristics to the functional requirements of the shoe. For example, the spring rate of the spring may be different at the front of the shoe than at the back or it may vary from side to side or both.

Figure 3:
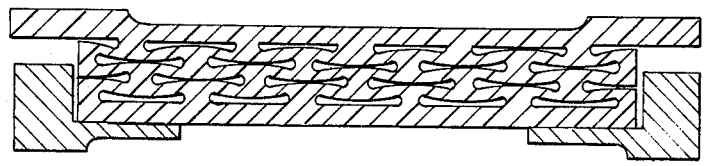
FIG. 3 is similar to FIG. 2 but shows the spring nearly fully deflected.

FIG. 3 is a sectional view similar to that of FIG. 2 but showing the spring, nearly fully compressed uniformly from side to side. It can compress non-uniformly with three degrees of freedom of the wear plate relative to the hoof, thus relieving loads caused by misalignments between the hoof and the terrain the hoof contacts. The deflection of the spring is limited by contacts of the broad faces of the slots and the design can be made such that the stresses at limit deflections are at or within the working stress of the material, with working stress defined as the maximum stress to which the material can be repeatedly subjected with acceptably minimum chances for fatigue or other kinds of failure.

Figure 4:
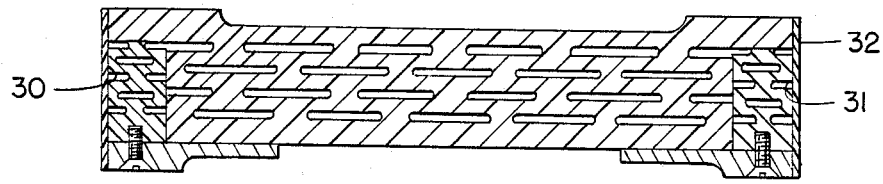
FIG. 4 is similar to FIG. 2 but includes auxiliary springs.

FIG. 4 is another sectional view similar to that of FIG. 2 but with the cutaways occupied by auxiliary springs 30 and 31, attached to the wear plate. Use of the auxiliary springs in combination with the elastomeric shields, shield 32 being typical, virtually eliminates chances for the function of the spring to be hampered by contamination with mud, sand, gravel or the like entering any spaces, slots or cavities in the horseshoe.

Design of a spring of suitable size, weight and energy capacity requires a material having a particular combination of characteristics, specifically density, modulus of elasticity and allowable working stress. A low modulus provides a desirable ratio of working deflection relative to size of the spring. The low density enables favorable ratios of section thickness to spring weight. The greater section thicknesses put the fibres which work in bending at greater distances from the neutral axes, enabling bending loads to be achieved with lower fibre stresses. In turn, the low modulus of elasticity enables adequate deflection even though the working fibres are relatively distant from the neutral axes and have, therefore, favorable mechanical advantage.

It is necessary that the material have, in addition to low modulus of elasticity and density and adequate strength, satisfactorily low internal damping, good resistance to fatigue failure and resistance to corrosion. One commercially available material having the necessary properties is called Delrin, a registered trademark name. Delrin, an acetal plastic, has a modulus of elasticity of 350,000 PSI, a density of 0.05 pounds per cubic inch and a safe working stress capability in bending of 17,000 pounds per square inch (PSI), within the bag 15,000 to 22,000 PSJ range for such materials.

The adequacy of the working strength of materials like Delrin is evidenced by their having working stress to density ratios in the same range as that of steel. The ratio for Delrin is 17,000/0.05=340,000 and that for steel is 100,000/0.286=349,650. 100,000 PSI is a typical working stress for heat treated steel subjected to repeated loads of the type known to produce fatigue failures. Another convenient basis for comparison of the adequacy of working strengths of materials is the ratio of modulus of elasticity to the allowable working stress. For steel, assuming a working stress as high as 160,000 PSI, the ratio is 0.0053. For Delrin the ratio is 0.049 or about 10 times that for steel. It has been found that materials having characteristics like these make it possible to provide horseshoes having useful energy storage and release capacities and having weight and size meeting the stated objectives.

Developmental work with the subject horseshoe has demonstrated that springs weighing in the range of 8 to 10 ounces meet the requirements of the invention, including the requirement for durability.

The wear plates can be made of aluminum alloy or any other material suited to the purpose such as plastics particularly noted for their toughness and resistance to wear. The wear plates may also include features intended to improve the performance of the horse, such as ribs to improve traction and the like.

It can be concluded from this description that the subject invention meets its stated objectives. The spring in the described preferred embodiment relieves the hoof from shock to the extent that under normal use no significant shock can be experienced unless and until the force on the hoof is in the range of 2000 pounds. Its weight and height are in the acceptable ranges of weight and height of horseshoes. It can be fitted and attached with conventional, state-of-the-art equipment and techniques. It is durable and also economical to manufacture. Also, qualitative testing shows that the corollary objective of improved performance is achievable.

While preferred embodiments of the invention are described herein, it will be clear to those skilled in the art that other embodiments and modifications of those described are possible within the scope of the invention which is limited only by the appended claims.

What is claimed is:

1. A shock relieving horseshoe having a top, a bottom, a first side, a second side, a front, a back and an external shape in plan view, said horseshoe comprising a spring, said spring comprising a top layer, a bottom layer, at least one intermediate layer having a first side and a second side, a plurality of compression members on said first side positioned with first spaces between them and a plurality of compression members on said second side positioned with second spaces between them, said second plurality of compression members being positioned opposite said first spaces, said top layer having a first thickness, said bottom layer having a second thickness and said at least one intermediate layer having a third thickness, said third thickness being less than said first and second thickness, said external shape essentially matching the outline of the bottom of a horse's hoof.

2. The horseshoe of claim 1 in which said compression members are ridges oriented essentially parallel to each other.

3. The horseshoe of claim 2 in which said ridges are oriented in a direction from said front to said back.

4. The horseshoe of claims 1, 2 or 3 in which said spring is made of material having a density in the range of 0.04 to 0.06 pounds per square inch, a safe working stress in bending in the range of 15,000 to 22,000 P.S.I. and a modulus of elasticity in the range of 350,000 to 500,000 pounds per square inch.

5. The horseshoe of claims 1, 2 or 3 further comprising a wear plate attached to said bottom.

6. The horseshoe of claims 1, 2 or 3 in which said spring is made of material having a density in the range of 0.04 to 0.06 pounds per square inch, a safe working stress in bending in the range of 15,000 to 22,000 P.S.I. and a modulus of elasticity in the range of 350,000 to 500,000 pounds per square inch and further comprising a wear plate attached to said bottom.

* * * * *